J. H. DOLBY.
CAMERA SHUTTER.
APPLICATION FILED APR. 14, 1911. RENEWED APR. 25, 1913.
1,084,137.  Patented Jan. 13, 1914.
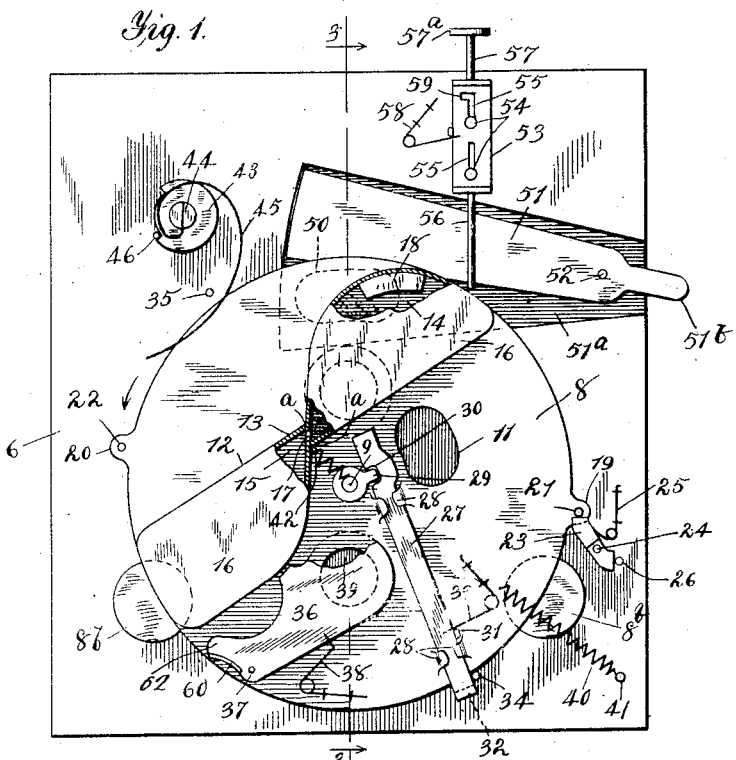
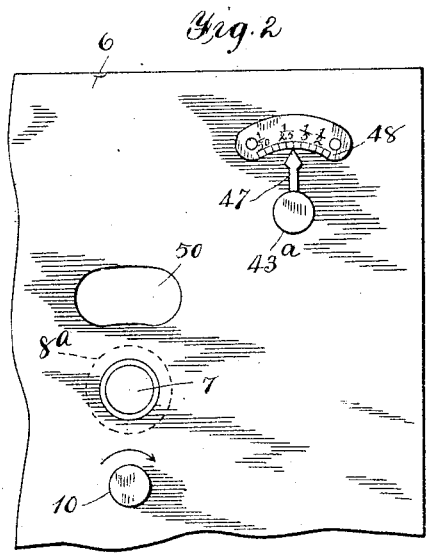
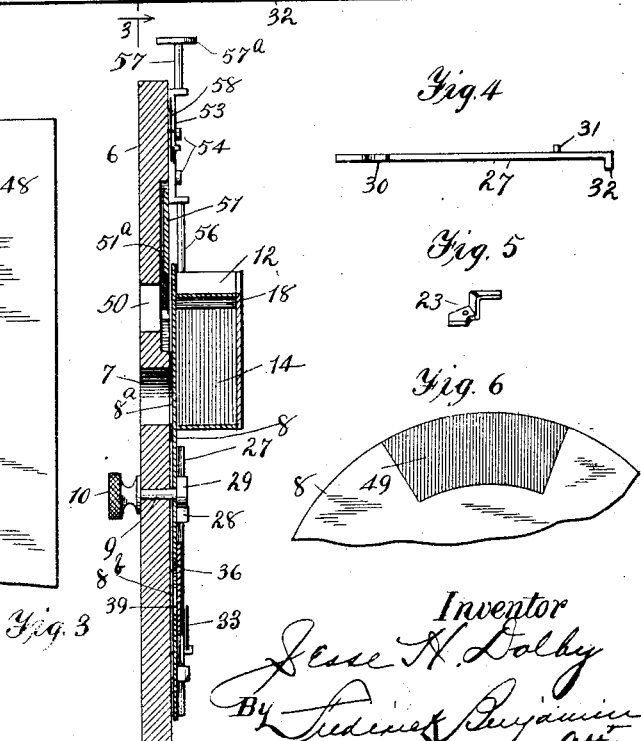
Witnesses
Chas. F. Bassett
M. A. Milord
Inventor
Jesse H. Dolby
By Frederick Benjamin
Atty

UNITED STATES PATENT OFFICE.

JESSE H. DOLBY, OF ELGIN, ILLINOIS.

CAMERA-SHUTTER.

1,084,137.     Specification of Letters Patent.     Patented Jan. 13, 1914.

Application filed April 14, 1911, Serial No. 621,031. Renewed April 25, 1913. Serial No. 763,652.

*To all whom it may concern:*

Be it known that I, JESSE H. DOLBY, citizen of the United States, residing at Elgin, in the county of Kane and State of Illinois, have invented certain new and useful Improvements in Camera-Shutters, of which the following is a specification.

My invention relates to photographic apparatus and refers especially to cameras of the box type provided with rotary shutters.

The paramount object of the improvements which constitute the subject matter of this application for patent is to provide a motor for driving the shutter.

Other subsidiary objects are to arrange a retarding device for governing the speed of the motor and the shutter operated thereby thus controlling the exposure period, and to provide a coöperating device for augmenting the power of the motor proper.

Another object is to arrange an auxiliary shutter that can be manually operated independently of the motor driven shutter.

A further object is to provide a visual signal for the purpose of indicating the position of the rotary shutter, from an observation point in front of the camera.

Further objects are to furnish a gravity operated motor, connected with which is a relatively fixed weight which serves the purpose of a governor to insure a uniform speed of the motor; to provide a double chambered container partly filled with granular material and so designed that one of the chambers will be completely emptied while slightly inclined, and to design the motor casing so that few pieces will be required in its construction thus permitting it to be manufactured economically.

The arrangement of the self operating shutter will permit the operator to take his own picture, either by instantaneous or "time" exposure, the interval between the setting and starting of the motor, giving him ample time to assume any desired pose in front of the camera, before the exposure takes place. The purpose of the indicator or signal device is to inform the persons who are being photographed whether the shutter is open or closed.

Among other advantages of my improved camera may be mentioned the noiseless action of the motor and shutter mechanism, the movement being smooth and without click or jar, thus rendering it commendable when nervous subjects are posing, and the easy motion eliminates all vibration which would tend to produce poor results in the negative.

I accomplish the desired objects above enumerated and others of importance by means of the construction illustrated in the accompanying drawing which forms a part of this application, the details of construction being disclosed in the following views:—

Figure 1 is a rear elevation of the front casing plate of a box camera furnished with a rotary shutter and equipped with a shutter-operating motor and subsidiary devices constituting my invention; Fig. 2 is a front elevation of a portion of the front plate; Fig. 3 is a sectional view on the line 3—3 of Fig. 1; Fig. 4 is a side elevation of the locking bar; Fig. 5 is a perspective view of the shutter dog, and Fig. 6 is a view showing a portion of the shutter bearing the signal.

Referring to the details of the drawings, the numeral 6 indicates the front casing plate of a box camera, the remaining walls being omitted, since the present invention has no relation thereto. This front plate is provided with the usual lens opening 7, centrally located, and controlled by a circular rotatable disk 8 constituting a shutter, pivoted on a stem 9, which extends through the shutter and the plate. 6, and carries upon the outer end a thumb nut 10. Surrounding the lens opening 7 between the shutter and casing plate is a thin washer or collar 8ª of felt or other similar material, its purpose being to exclude the light rays which might otherwise find their way through the opening 7 and between the adjacent walls of the plate and the shutter, and it also serves to give a suitable bearing for the latter. Thin felt disks 8ᵇ are glued to the front plate near the periphery of the shutter which also form friction cushions or bearings upon which the shutter will move without noise or vibration.

The shutter is provided with the usual exposure opening 11, of elongated form.

Mounted rigidly upon the rear of the shutter is a gravity motor 12, comprising a casing disposed to one side of the center of the disk, and extending across the rear face of the latter. The side walls of the casing of the motor are preferably formed of a single strip 13 of sheet material, having the opposite portions bent in opposite directions as shown so as to make two approximately equal chambers or compartments 14, 15. The extremities of the strip are soldered, or otherwise secured to the middle portion at the points a, a. The outer wall of the compartments is formed by a single plate 16, while the inner wall is formed, as will be obvious, by the shutter. That portion of the strip 13 which lies between the two chambers is pierced by an aperture 17 which forms a passage for the sand with which the motor casing is partially filled. Within the chamber or compartment 14, is fixed a counterweight 18, the purpose of which is to aid the action of the sand or other granular substance placed within the casing.

Projecting from the periphery of the shutter 8, are diametrically disposed lugs or ears 19, 20, provided respectively, with stop pins 21, 22, which project rearwardly. These pins are adapted to engage with a dog 23 pivoted at 24, and controlled by a spring 25, a stop 26 limiting the action of the spring.

Disposed upon the rear face of the disk 8 is a lock bar 27 retained in position by ears 28 struck up from the disk and bent loosely over the edges of the bar to form guides which permit longitudinal movement of said bar. The inner end of this locking bar is arranged in proximity to the pivot or stem 9 of the disk, and a lug 29 on the stem engages a notch 30 in the locking bar, so that by turning the thumb nut 10, the bar can be moved longitudinally, its movement in one direction being limited by a stop 31, on the bar which strikes the adjacent ear 28. The end of the bar is furnished with a lug or lip 32 which projects toward the front plate 6 and engages the margin of the disk or shutter to limit the movement of said bar inward. A spring 32 normally maintains the locking bar 27 in its extended or initial position shown in Fig. 1. Located upon the front plate 6 near the periphery of the disk 8 are shutter stops 34, 35, which are adapted to be engaged by the lug 32 on the extremity of the locking bar when the shutter is rotated. The stop 34 is set close to the margin of the disk and will engage with the lip or lug 32 only when the said bar 27 is retracted. When extended as shown in Fig. 1, the said bar will pass over this stop. The stop 35, on the contrary, is set farther away so as to strike the said lip 32 when the shutter is rotated with the locking bar extended, permitting the lip 32, however, to pass between said stop and the disk, when the bar 27 is in its retracted position.

Mounted upon the rear face of the disk or shutter 8 is an auxiliary shutter 36, pivoted at 37 and controlled by a spring 38. Beneath this auxiliary shutter the main shutter 8 is pierced by an exposure opening 39, which corresponds in size with the lens aperture in the casing plate 6 and is in registration with said aperture when the main shutter is turned so that the end of the locking bar engages the stop 35.

Extending across the rear face of the disk 8, but spaced therefrom a sufficient distance to clear the attachments, is a shutter driving spring 40. One end of this spring is secured to a fixed point 41 and the other fastened to a pin 42 mounted on the motor casing and located so that when the shutter is in the position shown in Fig. 1 a line joining the spring attachments will pass through the center of the disk 8.

Arranged upon the rear of the casing front 6 is a circular friction plate 43, mounted on a stem 44 to which is attached one end of a curved spring 45, the free end of which projects into the path of the motor casing. One side of said plate 43 is notched to form shoulders which are engaged by a stop pin 46. The outer end of the stem 44 is provided with a thumb nut 43ª and a pointer 47 which indicates upon a scale or index plate 48, the relative position of the plate 43. The purpose of this device is to retard the movement of the shutter by the engagement of the spring 45 with the motor casing 12 as it passes, the degrees of retardation given thereto being determined by the position of the friction plate.

The front face of the shutter is provided with a colored area 49 which forms a visual signal that may be observed from the front of the camera as it moves with the shutter across a sight aperture 50 in the casing front 6. This aperture is controlled by a screen 51 pivoted at 52 arranged in a recess 51ª in the plate 6, and provided with a handle, 51ᵇ, which projects from the side of the camera. This screen is held in adjusted position by friction.

Above the main shutter is arranged mechanism for operating the auxiliary shutter 36. This consists of a plate 53 slidably mounted on studs or screws 54 engaging slots 55 in the plate. A pin 56 extends downward to a point near the margin of the shutter 8, and a stem 57 surmounted by a button 57ª projecting upward serves as a handle. The plate is normally held in an extended position by a spring 58. The upper slot 55 has a lateral notch forming a shoulder 59 which is adapted to engage the corresponding stud 54 when the plate is at its lowest position. Such locking engagement is brought about by moving the handle 57 laterally when depressed, an opposite movement releasing the plate which will be immediately extended to its initial position by the spring 58.

The motive power employed to start the shutter operating device is derived from the shifting of the sand in the chambered compartment of the motor, granular substance being introduced within the casing 12 in sufficient quantity to nearly fill one of the chambers.

The manner of operating the automatic shutter is as follows:—We will suppose that all the sand has passed into the chamber 14 and the shutter is turned through an angle of 180° from the position shown in Fig. 1. When so placed the lip 32 on the locking bar 27 will engage the upper side of the stop 35. This will, of course, carry the motor to a position the reverse of that seen in Fig. 1, with the compartment 14 below and compartment 15 above. The pins 21 and 22 will also be alternated in position so that the pin 22 will rest upon the dog 23. The engagement of the bar 27 and the pin 22 with their respective stops 35 and 23 will hold the disk or shutter 8 in this initial or inoperative position until released in the manner to be described. The shutter is allowed to remain thus locked until it is required to be used for the purpose of making an exposure and while thus at rest the sand will all pass by gravity from the chamber 15 into the lower chamber 14, which contains the weight 18. This shifting of the sand from the upper to the lower chamber can have no moving effect upon the shutter at this time since it is positively locked, as previously mentioned. The pointer 47 is now turned to the time marked on the index plate which is deemed proper for the exposure. If it is desired to display the visual signal the lever or handle 51b is depressed so as to raise the screen 51 and uncover the aperture 50. The next step is to set the motor. This is done by grasping the nut 10 and turning it in the direction of the arrow as far as it will go. This movement will first retract the locking bar 27, so as to permit the lip 32 to clear the stop 35 and then carry the disk 8 through one half of a revolution or until the lip 32 on the said bar strikes the stop 34. The nut 10 is now released, and the bar 27 is returned by the spring 33 to its initial or extended position, shown in Fig. 1. The pin 21 will have been carried above the dog 23 and will rest thereon preventing any backward movement of the shutter from the overbalancing weights. When in this position the spring 40 will have no action since the direction of its tension passes through the pivotal center of the disk. The sand will immediately begin to run down from the upper chamber 14 to the lower chamber 15, and the center of gravity will be gradually shifted until the weight 18 is overbalanced by the sand in the lower compartment 15, and the disk 8 will begin to rotate. As soon as the weight 18 has passed the vertical plane taken through the axis of the shutter, its influence will be felt upon the shutter movement gradually increasing the speed, its action being supplemented by the spring 40. These combined forces will revolve the shutter until the lip 32 of the locking bar is intercepted by the stop 35, which will arrest the shutter movement, and the pin 22 having passed above the dog 23, the disk or shutter will be locked in its inoperative or initial position previously mentioned. The full chamber will now be above, being carried upward against the weight of the sand therein by the action of the counterweight 18, aided through a portion of the movement by the spring 40, the attachments of which will be again in line with the center of the disk 8 as the latter comes to rest in its locked position. The sand will now flow back into the weighted chamber 14, which is now below, and as soon as it has all passed into this compartment the device will be ready for a repetition of the operation above described.

If it is desired to use the auxiliary shutter for time exposure, the self-operating shutter 8 being in locked position, the plate 53 is depressed by pressing upon the button 57a, and the pin 56 striking a ledge or lug 60 on the short arm 62 of the auxiliary shutter 36 will turn the latter on its pivot 37 making an exposure through the opening 39, in the shutter 8, the said plate being locked down for the required time by the engagement of the shoulder 59, as previously mentioned with one of the retaining lugs.

The purpose of the display signal 49 is to notify the observer in front of the camera of the uncovering of the lens by the appearance of the colored target in the sight opening 50, the disappearance of the said signal indicating that the shutter has again closed. A snap shot can be taken when the auxiliary shutter is brought into play by a speedy movement of the button 57a, and an automatic snap shot will result if the plate 43 is turned so as to carry the spring 45 entirely out of the path of the motor casing when the motor is set in motion.

Having thus described my invention, what I claim as new, is:—

1. In a photographic camera, the combination with the casing, of a rotatable shutter, and a gravity controlled motor mounted thereon for operating said shutter.

2. In a photographic camera, the combination of a rotatable shutter, means mounted on said shutter for automatically operating same, and an auxiliary shutter mounted upon said rotatable shutter.

3. In a photographic camera, the combination of a rotatable shutter, a motor mounted upon and operating said shutter and means for governing the speed of the shutter when driven by the motor.

4. In a photographic camera, the combination of a rotary shutter having a plurality of exposure apertures therein, an auxiliary shutter mounted on said rotary shutter and controlling one of said apertures, means for operating said auxiliary shutter, and means for automatically operating said rotary shutter.

5. In a photographic camera, the combination with the casing, of a rotatable shutter, a gravity controlled motor mounted upon the shutter and adapted to drive the same, and means for locking said shutter in inoperative position.

6. A rotatable camera shutter, a gravity controlled motor for operating said shutter, means for holding the shutter in position for starting the motor, and means for locking the shutter in inoperative position.

7. A camera shutter having a plurality of exposure apertures therein, a gravity controlled motor for operating said shutter, means for holding the shutter in a position for starting the motor, a second shutter mounted upon the rotary shutter and controlling one of said apertures, and means for locking the first shutter in a predetermined position.

8. In a camera, the combination of a rotatable shutter having a signal indicated thereon, and a gravity controlled motor for operating said shutter.

9. In a camera, the combination of a rotatable shutter having means for indicating its position, a motor for operating said shutter, and means for governing the speed of the shutter when operated by the motor.

10. In a photographic camera having a lens aperture, a shutter adapted to control said aperture, and a gravity controlled motor adapted to operate said shutter.

11. In a photographic camera, the combination of a rotatable shutter, a gravity operated motor mounted thereon and adapted to operate the shutter, and a spring adapted to engage the shutter and modify the action of said motor.

12. In a photographic camera, the combination of a rotatable shutter, a motor mounted thereon, said motor comprising two compartments having a passage therebetween and a material placed therein and adapted to flow through said passage.

13. In a photographic camera, the combination of a rotatable shutter, a motor mounted thereon, said motor comprising two communicating chambers, a granular material in said chambers, a counterweight on said shutter, and a spring for engaging the shutter and adapted to regulate the movement thereof.

14. In a photographic camera, the combination with a rotatable shutter, of means for operating said shutter, said means comprising a shiftable weight and a relatively fixed weight arranged on the shutter and a spring adapted to retard the movement of the shutter.

15. In a photographic camera, the combination with a rotatable shutter of a motor for operating said shutter, a spring adapted to retard the action of the motor, an auxiliary shutter mounted on the rotatable shutter, means for operating said auxiliary shutter, said means adapted to hold said auxiliary shutter in position to expose the aperture controlled thereby.

16. In a photographic camera, the combination with a rotatable shutter, of a motor for operating said shutter mounted thereon, means for holding the shutter in position for starting the motor, means mounted on the shutter for controlling its speed, means for locking the shutter in inoperative position, an auxiliary shutter mounted upon the rotatable shutter, and common means for operating the auxiliary shutter and locking it in position to expose the aperture controlled thereby.

17. A camera shutter, comprising a disk rotatably mounted, and a motor casing on said disk, said casing constructed of a single strip of material attached by one margin to the face of said disk, and bent to form communicating compartments, and a cover therefor, substantially as described.

In testimony whereof I affix my signature in the presence of two witnesses.

JESSE H. DOLBY.

Witnesses:
H. De Los Higman,
M. A. Milord.